United States Patent
Chaluvarasanakopple Kumar

(10) Patent No.: US 10,044,721 B2
(45) Date of Patent: Aug. 7, 2018

(54) COMMUNICATION DEVICE AUTHENTICATION IN SMALL CELL NETWORK

(71) Applicant: Alcatel Lucent, Boulogne Billancourt (FR)

(72) Inventor: Madhusudana Chaluvarasanakopple Kumar, Bangalore (IN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/555,139

(22) PCT Filed: Jan. 27, 2016

(86) PCT No.: PCT/EP2016/051703
§ 371 (c)(1),
(2) Date: Sep. 1, 2017

(87) PCT Pub. No.: WO2016/146287
PCT Pub. Date: Sep. 22, 2016

(65) Prior Publication Data
US 2018/0041514 A1    Feb. 8, 2018

(30) Foreign Application Priority Data

Mar. 16, 2015  (EP) .................................... 15305388

(51) Int. Cl.
*H04L 29/06*      (2006.01)
*H04W 84/04*     (2009.01)
(Continued)

(52) U.S. Cl.
CPC ........... *H04L 63/101* (2013.01); *H04W 12/08* (2013.01); *H04W 48/02* (2013.01);
(Continued)

(58) Field of Classification Search
CPC .... H04L 63/101; H04W 48/02; H04W 12/08; H04W 84/045; H04W 12/06; G06F 21/44
See application file for complete search history.

(56) References Cited

U.S. PATENT DOCUMENTS

| | | | | |
|---|---|---|---|---|
| 9,437,063 | B2* | 9/2016 | Schoenfelder | G07C 9/00309 |
| 2005/0254651 | A1* | 11/2005 | Porozni | H04L 63/0892 380/270 |

(Continued)

*Primary Examiner* — Brandon J Miller
(74) *Attorney, Agent, or Firm* — Patti & Malvone Law Group, LLC

(57) ABSTRACT

A technique is provided for authenticating a first communication device located in a coverage area of a base station. The base station receives a localization message from the first communication device, the localization message containing an identifier of the first communication device. The base station interrogates a register to retrieve a call number associated with the first communication device by means of the identifier of the first communication device. The base station sends a request message to a second communication device that contains the call number and a request for access to the base station. The base station receives a response message from the second communication device, and if the response message contains a positive response to the request, the first communication device is granted access to the base station.

11 Claims, 2 Drawing Sheets

(51) Int. Cl.
*H04W 48/02* (2009.01)
*H04W 12/08* (2009.01)
*H04W 12/06* (2009.01)
*G06F 21/44* (2013.01)

(52) U.S. Cl.
CPC .......... *H04W 84/045* (2013.01); *G06F 21/44* (2013.01); *H04W 12/06* (2013.01)

(56) References Cited

U.S. PATENT DOCUMENTS

| | | | | |
|---|---|---|---|---|
| 2008/0051088 | A1* | 2/2008 | Tariq | H04L 63/102 455/436 |
| 2009/0093232 | A1* | 4/2009 | Gupta | H04L 63/104 455/410 |
| 2012/0083270 | A1* | 4/2012 | Robbins | H04W 4/14 455/435.1 |
| 2012/0093008 | A1* | 4/2012 | Diachina | H04L 43/0876 370/252 |
| 2013/0309971 | A1* | 11/2013 | Kiukkonen | H04L 63/107 455/41.2 |
| 2015/0085848 | A1* | 3/2015 | Reunamaki | H04W 12/04 370/338 |
| 2015/0237053 | A1* | 8/2015 | Duggana | H04L 63/10 726/4 |
| 2015/0281218 | A1* | 10/2015 | Bowser | H04L 63/0823 726/7 |

* cited by examiner

COMMUNICATION DEVICE AUTHENTICATION IN SMALL CELL NETWORK

FIELD OF THE INVENTION

The present invention pertains to the authentication of a user of a communication device located in a small cell network.

BACKGROUND

Currently, there is no simple way for a user owning a small cell to authenticate and authorize a guest user located in the small cell.

An existing method is to add the guest user in to an access list by requesting operator, and no direct privilege is given to the user owning the small cell.

There is a need for a user owning a small cell to be able to manage an access list of users authorized to be connected to the small cell.

SUMMARY

This summary is provided to introduce concepts related to the present inventive subject matter. This summary is not intended to identify essential features of the claimed subject matter nor is it intended for use in determining or limiting the scope of the claimed subject matter.

In accordance with one embodiment, a method is provided for authenticating a first communication device located in a coverage area of a base station, comprising the following steps performed by the base station:

receiving a localization message from the first communication device, the localization message containing an identifier of the first communication device, interrogating a register to retrieve a call number associated with the first communication device by means of the identifier of the first communication device, sending a request message to a second communication device, the request message containing the call number and a request for access to the base station, receiving a response message from the second communication device, if the response message contains a positive response to the request, granting the first communication device access to the base station.

Advantageously, the user owning the small cell can authorize other users even when said user is out of premises, can have the control of guest user's usage time, can get the information of communication device that tries to enter the premises or coverage area, can preempt or extend the timer by sending a message to the operator The guest user will not be aware of permissions and can use the small cell network seamlessly.

The owner of the base station will be able to know the call numbers and associated users which have tried to latch to the base station, so surveillance can also be achieved as security aspects.

In an embodiment, the identifier of the first communication device is the international identity of the first communication device.

In an embodiment, the base station sends the request message to the second communication device, if the call number is present in a contact list.

In an embodiment, the base station does not grant the first communication device access to the base station, if the response message is not received before the end of a countdown triggered after the sending of the request message.

In an embodiment, the response message further contains a timer value defining a duration of allowed access to the base station.

In an embodiment, the request message and the response message are short messages.

In an embodiment, the request message and the response message are HTTP messages.

The invention also pertains to a base station for authenticating a first communication device located in a coverage area of the base station, comprising:

means for receiving a localization message from the first communication device, the localization message containing an identifier of the first communication device, means for interrogating a register to retrieve a call number associated with the first communication device by means of the identifier of the first communication device, means for sending a request message to a second communication device, the request message containing the call number and a request for access to the base station, means for receiving a response message from the second communication device, means for granting the first communication device access to the base station, if the response message contains a positive response to the request.

The invention also pertains to a computer program capable of being implemented within a base station, said program comprising instructions which, when the program is executed within said base station, carry out steps according to the method according to the invention.

BRIEF DESCRIPTION OF THE FIGURES

Some embodiments of the present invention are now described, by way of example only, and with reference to the accompanying drawings. The same reference number represents the same element or the same type of element on all drawings.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
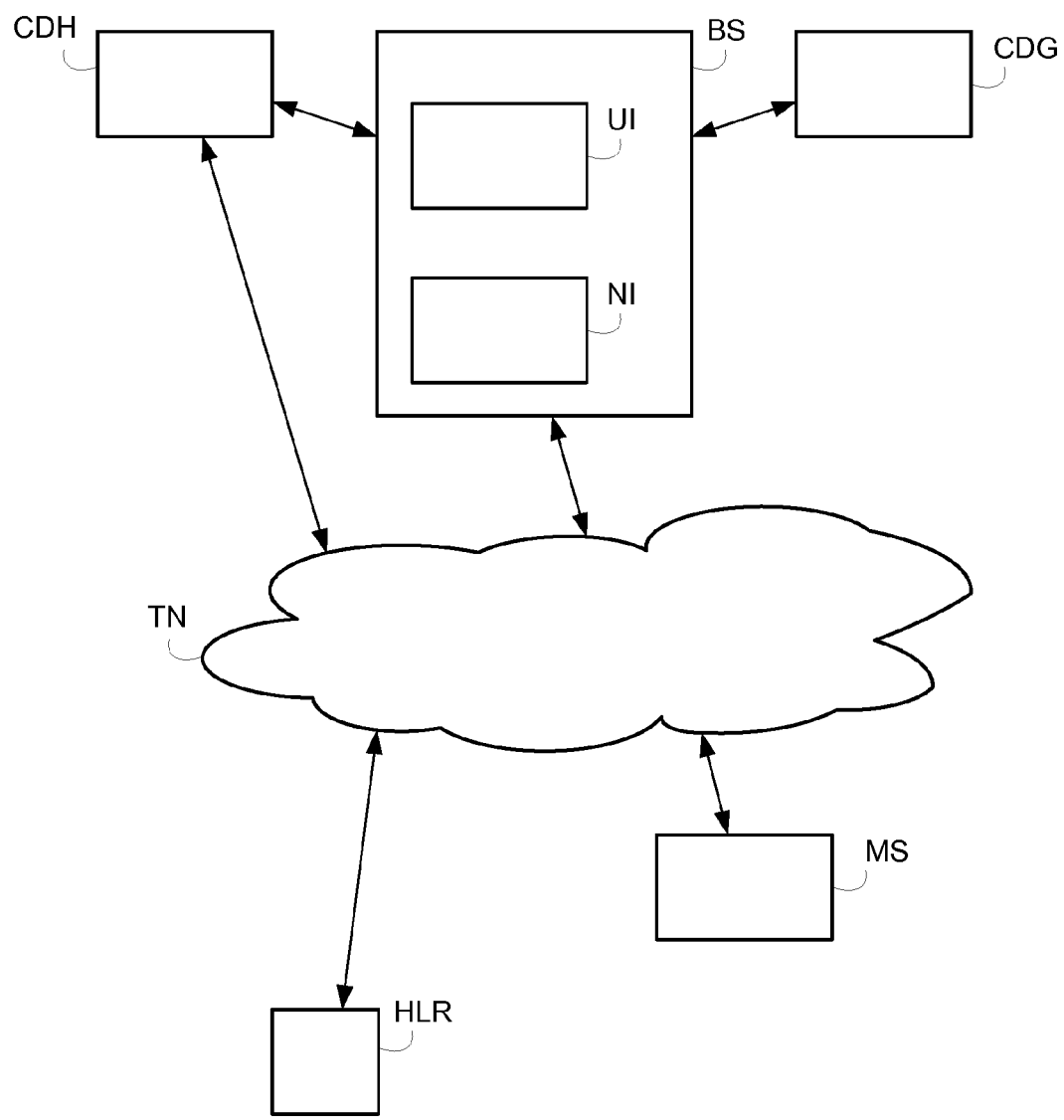
FIG. 1 is a schematic block diagram of a communication system according to one embodiment of the invention for an authentication of a communication device located in a small cell network.

Referring to FIG. 1, a communication system comprises a base station BS, a host communication device CDH and a guest communication device CDG which are able to be connected to the base station BS. The communication system comprises also a messaging server MS and a register HLR, which are able to communicate between them and with the base station BS via a telecommunication network TN.

For example, the base station is a pico base station or a femto base station located in residential buildings. The base station is linked to the core of the telecommunication network TN, typically via a modem and a wired line.

The base station includes baseband processing and radio module for a coverage area which access type is GSM (Global System for Mobile communications) coupled with a GPRS (General Packet Radio Service) network or UMTS (Universal Mobile Telecommunications System) or even CDMA (Code Division Multiple Access) or even LTE (Long Term Evolution).

The base station comprises a user interface UI and a network interface NI.

The user interface UI gives access to a contact list and permits the host user to modify the contact list. The contact list contains call numbers. The host communication device of the host user implements an application to login to this user interface with credentials, giving access to privileged tasks via a graphical interface.

The user interface UI implements a timer monitoring the network usage time of the guest user. In one example, timer waits for five minutes to get a response from the host communication device; if no response is received from host communication device for five minutes then it will be treated as negative and no guest communication device will be added to the contact list.

The user interface UI manages also time extension requests received from the host communication device.

The network interface NI is responsible for composing and sending short messages to the host communication device and for reading the short messages sent from the messaging server MS to do the required task inside the base station.

The network interface NI maintains the contact list in a database and communicates with the user interface.

A communication device CDH, CDG is capable of establishing a communication within a telecommunication network TN, for example with another communication device, via a radio link with the base station. For instance, a communication device is a mobile telephone, a smartphone, or a tablet, an electronic telecommunication device or object that is personal to the user.

The register HLR is accessible by the base station BS through the telecommunication network TN. The register HLR is similar to a database containing an international identity IMSI (International Mobile Subscriber Identity) associated with a subscription profile for each user in the telecommunication network TN, especially for the users of the host communication device CDH and the guest communication device CDG.

The messaging server MS is able to parse messages sent from the host communication device CDH towards the base station.

Figure 2:
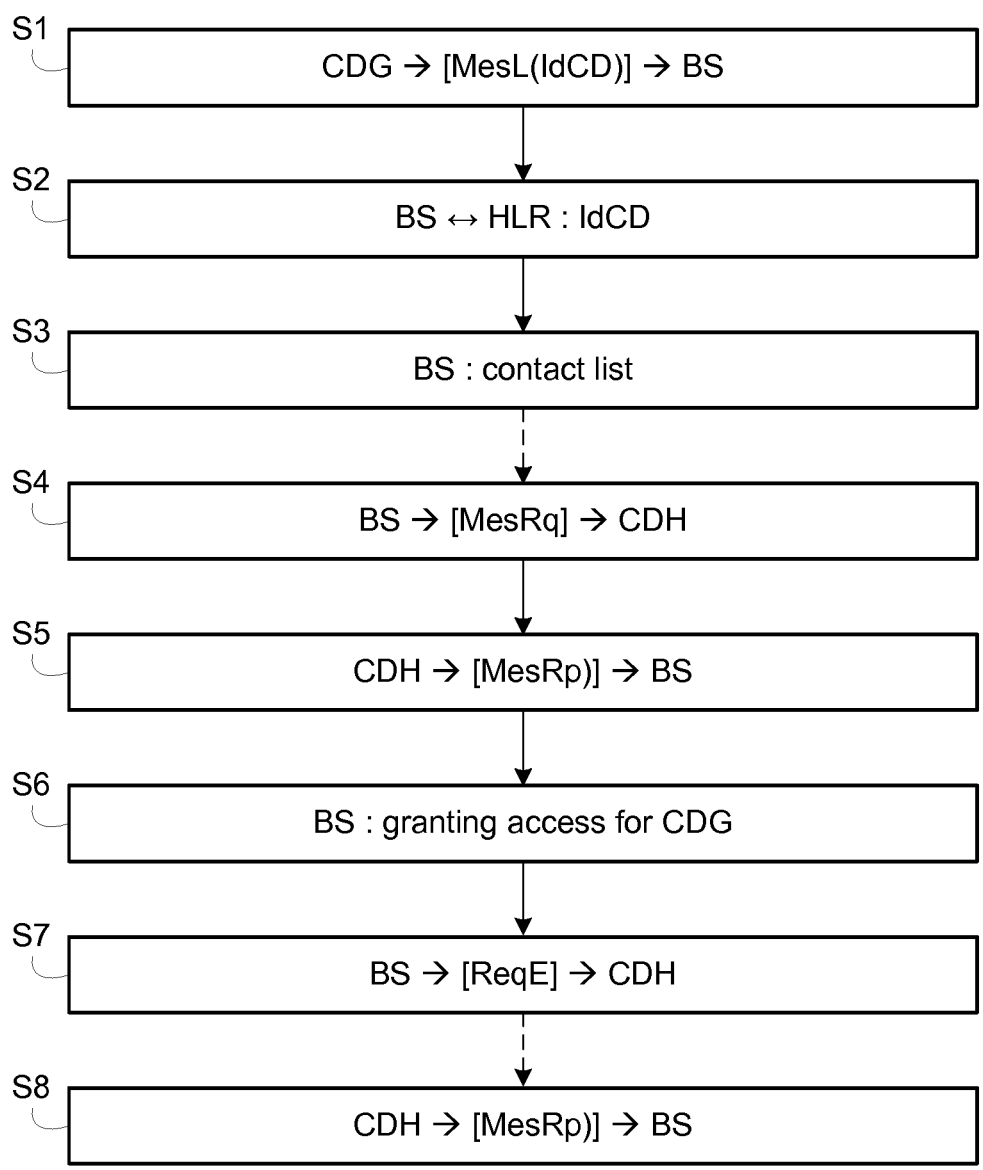
FIG. 2 is a flow chart illustrating a method for an authentication of a communication device located in a small cell network according to one embodiment of the invention.

With reference to FIG. 2, a method for an authentication of a communication device located in a small cell network according to one embodiment of the invention comprises steps S1 to S8 executed within the communication system.

In step S1, the guest communication device CDG enters the coverage area of the base station and sends a localization message MesL to the base station BS. The localization message MesL contains an identifier IdCD of the guest communication device CDG. For example, the identifier is the international identity IMSI (International Mobile Subscriber Identity) associated with the guest communication device.

In step S2, the base station BS interrogates the register HLR to retrieve a call number associated with the guest communication device CDG by means of the identifier IdCD of the guest communication device CDG. To this end, the base station BS sends a request to the messaging server MS, the request containing the identifier of the guest communication device CDG, e.g. the international identity IMSI. The messaging server parses the request to extract the identifier of the guest communication device CDG and sends another request to the register HLR, containing instructions interpretable by the HLR. The register HLR determines the call number associated with the identifier IdCD. The register HLR sends a response to the base station, the response containing the call number.

In step S3, the base station BS determines if the call number is present in the contact list.

If the call number is not present in the contact list, the base station BS does not take any further action, and the guest communication device will not access the small cell network.

If the call number is present in the contact list, the method goes to step S4.

In step S4, the base station BS sends a request message MesRq to the host communication device CDH.

The request message MesRq contains the call number and a request for access to the base station.

Additionally, the base station BS triggers a countdown running till a response to the sent request message MesRq is received. If no response is received before the end of the countdown, the base station drops the request considering the user of the host communication device CDH does not accept the request and the guest communication device will not access the small cell network.

In one embodiment, the request message MesRq is a short message SMS.

In one embodiment, the request message MesRq is a HTTP request sent towards the application implemented in the host communication device. If the base station does not receive an acknowledgement message, which means that the host communication device does not have internet access, the base station sends another request message MesRq under the form of a short message SMS.

In step S5, the user makes a decision for allowing the guest communication device associated with the call number an access to the base station. The user can view a user name associated with the call number in the contact database of the host communication device.

The host communication device CDH sends a response message MesRp towards the base station BS. The response message contains a positive response to the request or a negative response to the request. In case of positive response, the response message further contains a timer value defining a duration of allowed access to the base station.

In one embodiment, the request message MesRq is a short message SMS and the response message MesRp is also a short message. In this case, the content of the message is entered by the user as typing usual SMS. For example, the content of the message is "yes duration 5 min". The base station receives the response message MesRp, forwards this latter to the messaging server that parses the response message MesRp to extract the user response and the duration and sends back a message to the base station, the message containing instructions interpretable by the base station.

In one embodiment, the request message MesRq is a HTTP request and the response message MesRp is a HTTP message. In this case, the application in the host communication device CDH provides a user interface inviting user to select or enter values for the base station access request and the duration.

In step S6, the base station BS associates the call number with an access indicator and grants the guest communication device CDG access to the base station network. The access is granted for a period corresponding to the timer value.

In step S7, when the timer reaches the limit set by the timer value, the base station BS sends an extend request ReqE to the host communication device CDH. The extend request ReqE contains the call number and a request for extension time for the access to the base station.

In step S8, the user makes a decision for allowing the guest communication device associated with the call number an extended duration for access to the base station. As in step S5, the host communication device CDH sends a response message MesRp towards the base station BS. The response message contains a positive response to the request or a negative response to the request. In case of positive response, the response message further contains a timer value defining a duration of allowed access to the base station.

The invention described here relates to a method and a base station for an authentication of a user of a communication device located in a small cell network. According to one implementation of the invention, steps of the invention are determined by the instructions of a computer program incorporated into a base station. The program comprises program instructions which, when said program is loaded and executed within the base station, carry out the steps of the method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the method according to the invention.

The invention claimed is:

1. A method for authenticating a first communication device of a first user located in a coverage area of a base station, comprising the following steps performed by the base station: receiving a localization message from the first communication device of the first user, the localization message containing an identifier of the first communication device; interrogating a register to retrieve a call number associated with the first communication device by means of the identifier of the first communication device; sending a request message to a second communication device of a second user, the request message containing the call number and a request for access to the base station; receiving a response message from the second communication device of the second user; and if the response message contains a positive response to the request, granting the first communication device access to the base station.

2. The method according to claim 1, wherein the identifier of the first communication device is an international identity of the first communication device.

3. The method according to claim 1, further comprising sending the request message to the second communication device if the call number is present in a contact list.

4. The method according to claim 1, further comprising denying the first communication device access to the base station if the response message is not received before the end of a countdown triggered after the sending of the request message.

5. The method according to claim 1, wherein the response message further contains a timer value defining a duration of allowed access to the base station.

6. The method according to claim 5, further comprising sending an extend request to the second communication device when a limit of the timer value is reached, wherein the extend request contains the call number and a request for extension time for the access to the base station.

7. The method according to claim 1, wherein the request message and the response message are short messages.

8. The method according to claim 1, wherein the request message and the response message are Hypertext Transfer Protocol (HTTP) messages.

9. The method according to claim 1, wherein the first communication device and the second communication device comprise a mobile telephone, a smartphone, or a tablet.

10. A base station for authenticating a first communication device of a first user located in a coverage area of the base station, comprising: means for receiving a localization message from the first communication device of the first user, the localization message containing an identifier of the first communication device; means for interrogating a register to retrieve a call number associated with the first communication device by means of the identifier of the first communication device; means for sending a request message to a second communication device of a second user, the request message containing the call number and a request for access to the base station; means for receiving a response message from the second communication device of the second user; and means for granting the first communication device access to the base station if the response message contains a positive response to the request.

11. A non-transitory information medium storing computer executable instructions for performing steps and being implemented within a base station for authenticating a first communication device of a first user located in a coverage area of the base station, comprising: receiving a localization message from the first communication device of the first user, the localization message containing an identifier of the first communication device; interrogating a register to retrieve a call number associated with the first communication device by means of the identifier of the first communication device; sending a request message to a second communication device of a second user, the request message containing the call number and a request for access to the base station; receiving a response message from the second communication device of the second user; and if the response message contains a positive response to the request, granting the first communication device access to the base station.

* * * * *